(12) United States Patent
Elliott

(10) Patent No.: US 10,757,164 B2
(45) Date of Patent: Aug. 25, 2020

(54) PERFORMANCE IMPROVEMENT OF WEB PAGES BY ON-DEMAND GENERATION OF COMPOSITE IMAGES

(71) Applicant: PayPal, Inc., San Jose, CA (US)

(72) Inventor: David E. Elliott, Los Gatos, CA (US)

(73) Assignee: PayPal, Inc., San Jose, CA (US)

( * ) Notice: Subject to any disclaimer, the term of this patent is extended or adjusted under 35 U.S.C. 154(b) by 210 days.

(21) Appl. No.: 14/521,278

(22) Filed: Oct. 22, 2014

(65) Prior Publication Data

US 2016/0119400 A1   Apr. 28, 2016

(51) Int. Cl.
G06F 15/173 (2006.01)
H04L 29/08 (2006.01)
H04L 29/06 (2006.01)

(52) U.S. Cl.
CPC .......... H04L 67/02 (2013.01); H04L 67/1095 (2013.01); H04L 67/125 (2013.01); H04L 67/42 (2013.01)

(58) Field of Classification Search
CPC .......... G06F 17/30905; H04N 1/00209; H04L 67/02
USPC ....................................... 709/203
See application file for complete search history.

(56) References Cited

U.S. PATENT DOCUMENTS

| | | |
|---|---|---|
| 5,652,851 A | 7/1997 | Stone et al. |
| 7,471,947 B1 | 12/2008 | Papineau |
| 7,568,202 B1 | 7/2009 | Papineau et al. |
| 8,010,624 B2 * | 8/2011 | Scott ................. G06F 17/30265 709/216 |
| 8,219,633 B2 | 7/2012 | Fainberg et al. |
| 8,250,457 B2 | 8/2012 | Fainberg et al. |
| 8,321,533 B2 | 11/2012 | Fainberg et al. |
| 8,346,784 B1 | 1/2013 | Potekhin et al. |
| 8,346,885 B2 | 1/2013 | Fainberg et al. |
| 8,495,171 B1 * | 7/2013 | Potekhin .......... G06F 17/30899 709/217 |
| 2004/0012601 A1 | 1/2004 | Sang, Jr. et al. |
| 2008/0046424 A1 * | 2/2008 | Horton ................ G06F 17/3025 |
| 2009/0217145 A1 | 8/2009 | Watson |
| 2009/0248831 A1 * | 10/2009 | Scott ....................... G06T 11/60 709/217 |
| 2009/0276488 A1 | 11/2009 | Alstad |
| 2010/0235329 A1 | 9/2010 | Koren et al. |

(Continued)

FOREIGN PATENT DOCUMENTS

| | | |
|---|---|---|
| WO | WO-2012128947 A2 | 9/2012 |
| WO | WO-2012128947 A3 | 9/2012 |

OTHER PUBLICATIONS

"U.S. Appl. No. 13/051,811, Final Office Action dated Jul. 2, 2013", 17 pgs.

(Continued)

*Primary Examiner* — Umar Cheema
*Assistant Examiner* — Anh Nguyen

(57) ABSTRACT

A system and method for improving performance of Web Pages by On-Demand Generation of Composite images is disclosed. A server system receives a request for a first webpage from a first client system. The server system identifies a list of one or more images referenced in the requested first webpage. The server system groups the identified one or more images into one or more first files. The server system then transmits the one or more first files to the first client system.

20 Claims, 11 Drawing Sheets

(56) References Cited

U.S. PATENT DOCUMENTS

| | | | |
|---|---|---|---|
| 2010/0235473 | A1 | 9/2010 | Koren et al. |
| 2011/0010617 | A1 | 1/2011 | Kim et al. |
| 2011/0113000 | A1 | 5/2011 | Marlow |
| 2011/0167332 | A1 | 7/2011 | Nickas, Jr. |
| 2011/0185018 | A1 | 7/2011 | Osuga |
| 2011/0216981 | A1 | 9/2011 | Hiraga et al. |
| 2011/0239108 | A1* | 9/2011 | Blomquist .......... G06F 17/3089 715/235 |
| 2012/0066304 | A1 | 3/2012 | Marmon et al. |
| 2012/0066601 | A1 | 3/2012 | Zazula et al. |
| 2012/0089933 | A1 | 4/2012 | Garand et al. |
| 2012/0155292 | A1 | 6/2012 | Zazula et al. |
| 2012/0194519 | A1* | 8/2012 | Bissell .............. G06F 17/30905 345/428 |
| 2012/0240033 | A1 | 9/2012 | Soni et al. |
| 2012/0287116 | A1 | 11/2012 | Massimino et al. |
| 2013/0036193 | A1 | 2/2013 | Padmanabhan |
| 2014/0204743 | A1* | 7/2014 | Garcia .................. H04L 47/18 370/231 |

OTHER PUBLICATIONS

"U.S. Appl. No. 13/051,811, Non Final Office Action dated Dec. 26, 2012", 16 pgs.

"U.S. Appl. No. 13/051,811, Response filed Mar. 18, 2013 to Non Final Office Action dated Dec. 26, 2012", 16 pgs.

"U.S. Appl. No. 13/051,811, Response filed Sep. 26, 2013 to Final Office Action dated Jul. 2, 2013", 12 pgs.

"U.S. Appl. No. 13/535,942, Final Office Action dated Apr. 23, 2014", 22 pgs.

"U.S. Appl. No. 13/535,942, Non Final Office Action dated Jul. 17, 2014", 15 pgs.

"U.S. Appl. No. 13/535,942, Non Final Office Action dated Nov. 8, 2013", 22 pgs.

"U.S. Appl. No. 13/535,942, Response filed Apr. 8, 2014 to Non Final Office Action dated Nov. 8, 2013", 13 pgs.

"U.S. Appl. No. 13/535,942, Response filed Jun. 30, 2014 to Final Office Action dated Apr. 23, 2014", 12 pgs.

"Cache algorithms", Wikipedia®, [Online]. Retrieved from the Internet: <http://en.wikipedia.org/wiki/Cache_algorithms>, (Accessed Aug. 14, 2012), 7 pgs.

"Chunked transfer encoding", Wikipedia®, [Online]. Retrieved from the Internet: <http://en.wikipedia.org/wiki/Chunked_transfer_encoding>, (Accessed Aug. 14, 2012), 4 pgs.

"Google Developers Blog", Google Developers Blog, (Nov. 2010). "ImageURIGen", [Online]. Retrieved from the Internet: <https://github.com/senthilp/ImageURIGen>, (Accessed Aug. 13, 2012), 4 pgs.

"Application Serial No. PCT/US2012/028044, International Preliminary Report on Patentability dated Oct. 3, 2013", 7 pgs.

"International Application Serial No. PCT/US2012/028044, Search Report dated Sep. 28, 2012", 3 pgs.

"International Application Serial No. PCT/US2012/028044, Written Opinion dated Sep. 28, 2012", 5 pgs.

"JSONP", Wikipedia®, [Online]. Retrieved from the Internet: <http://en.wikipedia.org/wiki/JSONP>, (Accessed Aug. 14, 2012), 5 pgs.

Delany, Mark, "The Pluton Network", [Online]. Retrieved from the Internet: <URL: http://markdelany.github.io/Pluton/1.0/index.html>, (Oct. 16, 2009), 5 pgs.

Goetz, Brian, et al., "Task Execution", Java Concurrency in Practice, Addison-Wesley, (2006), 113-134.

Harmes, Ross, "Ajax", High Performance JavaScript, O'Reilly Media. Inc., (2010), 125-150.

Shea, Dave, "CSS Sprites: Image Slicing's Kiss of Death", Published in: Browsers, CSS, HTML and XHTML, [Online]. Retrieved from the Internet: <http://www.alistapart.com/articles/sprites/>, (Mar. 5, 2004), 8 pgs.

Smith, Connie U, et al., "Performance-Oriented Design", Performance Solutions: A Practical Guide to Creating Responsive, Scalable Software, Addison-Wesley, (2002), 241-260.

Souders, Steve, "CSS Sprites", High Performance Websites: Essential Knowledge for Frontend Engineers, O'Reilly Media , Inc., (2007), 11-13.

Souders, Steve, "Optimizing Sprites", Even Faster Websites, O'Reilly Media, Inc., (2009), 153-155.

Welsh, Matt, et al., "A Design Framework for Highly Concurrent Systems", UC Berkeley Technical Report UCB/CSD-00-1108, (Apr. 2000), 14 Pages.

Williams, Hugh, "Site Speed for eBay Search Results—Part two", Software Engineering, [Online]. Retrieved from the Internet: <http://www.ebaytechblog.com/2010/09/30/site-speed-for-ebay-search-results-%E2%80%93-part-two/>, (Sep. 30, 2010), 4 pgs.

\* cited by examiner

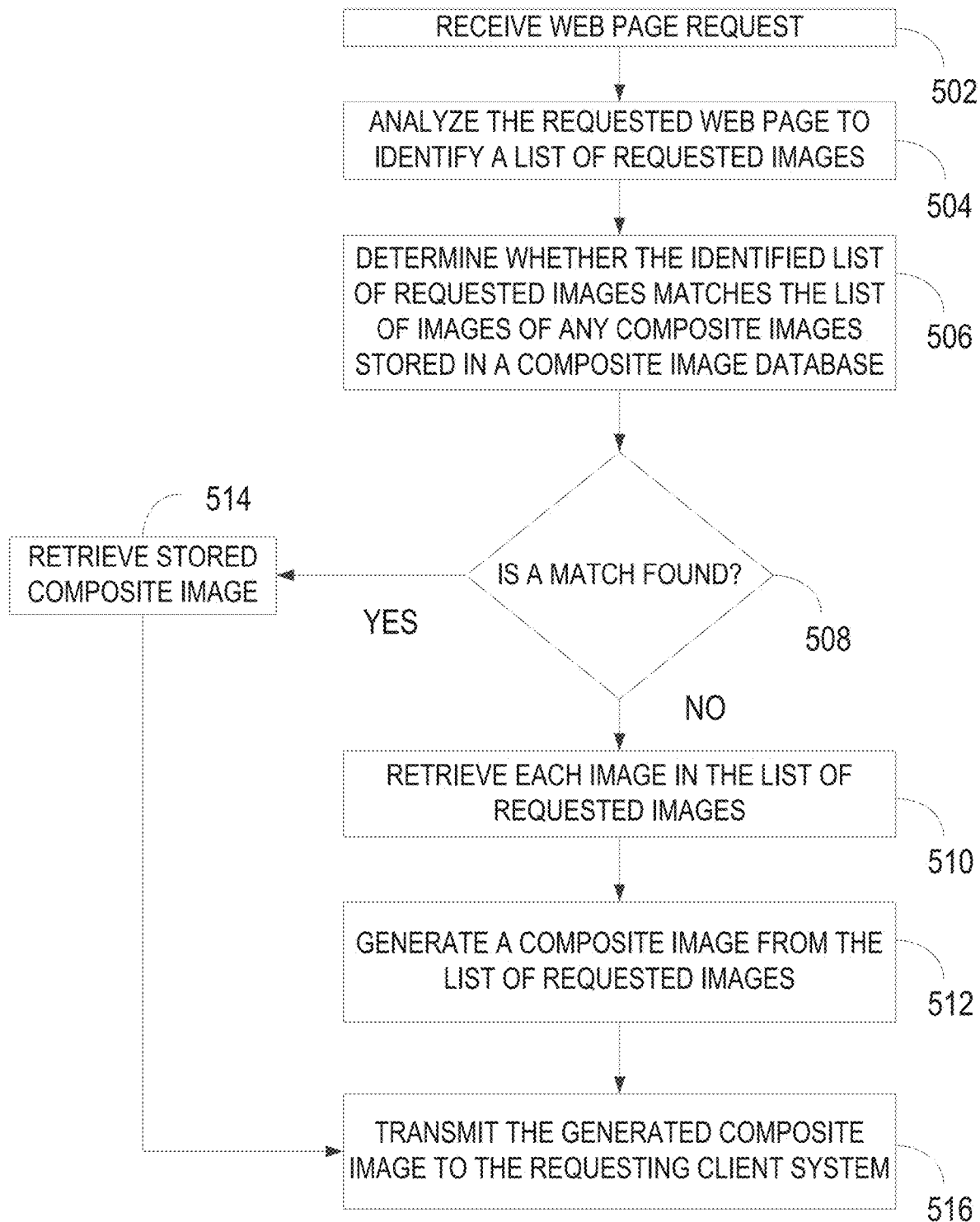

PERFORMANCE IMPROVEMENT OF WEB PAGES BY ON-DEMAND GENERATION OF COMPOSITE IMAGES

TECHNICAL FIELD

This application relates generally to the field of serving web pages over a network and specifically to improving the efficiency in transmitting data to client systems.

BACKGROUND

The rise of the computer age has resulted in increased access to personalized services online. As the cost of electronics and networks drop, many services that were previously provided in person are now provided remotely over the Internet. For example, entertainment has increasingly shifted to the online space with companies streaming television (TV) shows and movies to members at home. Similarly, electronic mail (e-mail) has reduced the need for letters to be physically delivered, instead, messages can be sent over networked systems almost instantly. Online social networking sites allow members to build and maintain personal and business relationships in a much more comprehensive and manageable manner.

BRIEF DESCRIPTION OF HE DRAWINGS

The present description is illustrated by way of example, and not by way of limitation, in the figures of the accompanying drawings, in which:

FIG. 5 is a flow diagram illustrating a process for improving performance of web pages by on-demand generation of composite images, in accordance with some embodiments.

Like reference numerals refer to corresponding parts throughout the drawings.

DETAILED DESCRIPTION

Figure 1:
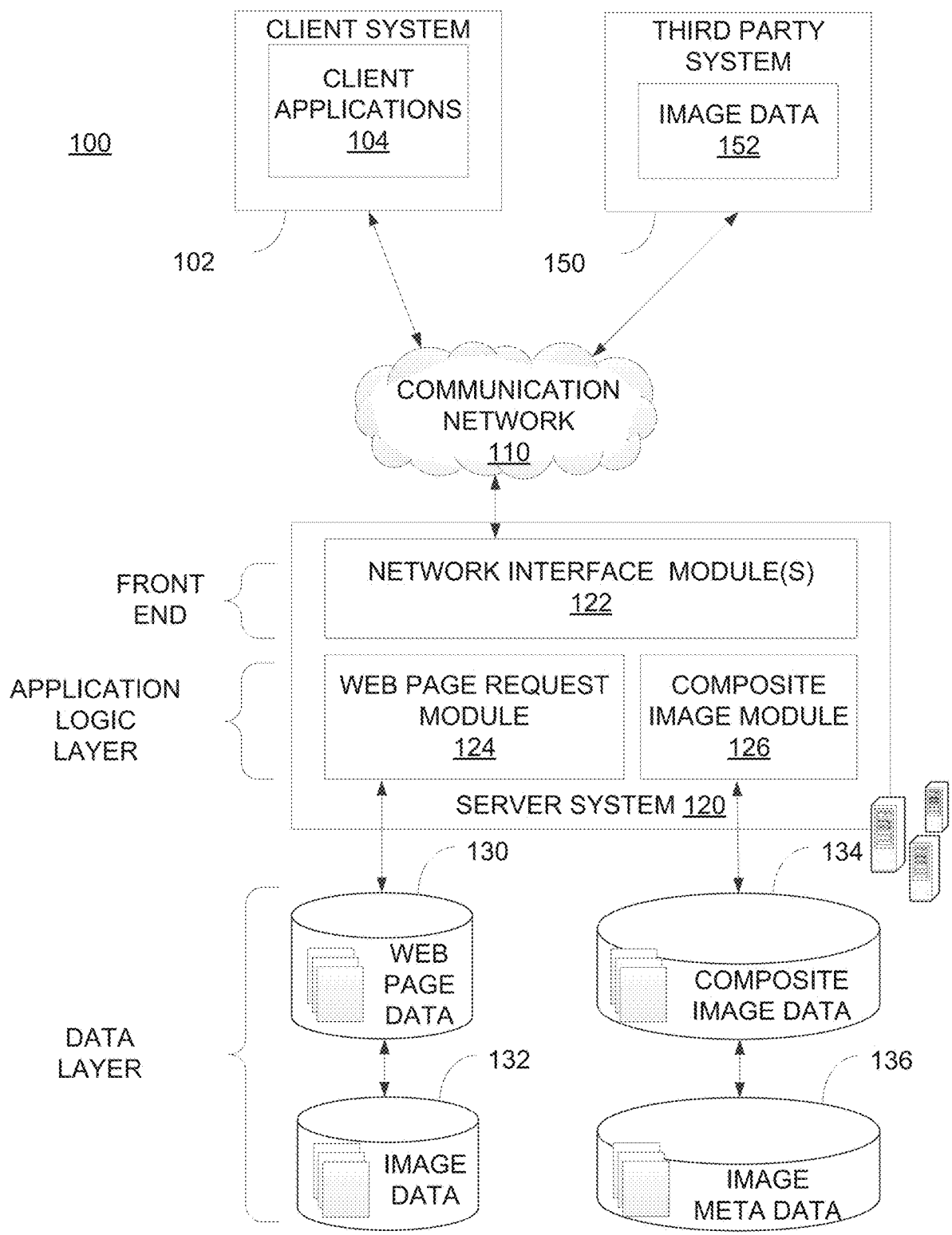
FIG. 1 is a block diagram illustrating a client-server system that includes one or more client systems and a server system, in accordance with some embodiments.

Although the embodiments have been described with reference to specific example embodiments, it will be evident that various modifications and changes may be made to these embodiments without departing from the broader spirit and scope of the description. Accordingly, the specification and drawings are to be regarded in an illustrative rather than a restrictive sense.

In various embodiments, methods and systems for improving performance of web pages by on-demand generation of composite images are disclosed. It is common practice for web pages to include references to images or other files that are not included with the web page and are separately retrieved by the client system. For example, a web page includes an <img> tag with a source file location. The client system requests the image from the source file location and, when it receives the image file, displays it with the rest of the web page. For example, each image results in a separate Hyper Text Transfer Protocol (HTTP) request. However, some web pages include references to a large number of images or other files. Traditionally each image results in a distinct request over a separate web connection. Thus, a web page with a significant number of image requests will result in a large number of connections. This is a problem for two basic reasons. First, if there is a network latency issue that already exists, each separate connection be delayed by it. Secondly, many web browsers limit the number of active connections that a given web page can initiate at a given time. These factors combine to result in a noticeable delay when a web page with a large number of image links is requested.

This is especially difficult for dynamically generated web pages. The server system cannot pre-generate composite images for web pages that are dynamically generated. This is because the server system does not know which images will be included in the dynamically generated web page (and there are far too many possibilities to pre-generate them all). The server system alleviates this problem by optimizing delivery of image files. A server system receives a web page request from a client system. In response, the server system locates the requested web page and identifies a list of referenced image files (or other files) within the web page. The server system then collects all the referenced image files. All the files are then automatically grouped into a single file some example embodiments this single file is a composite image.

The server system then stores the composite image into a database of composite images. Each composite image includes a list of the component images and their position within the composite image. The server system then sends the composite image to the requesting client system. The client system then uses information included with the composite images to extract each individual image for display with the requested web page.

In some example embodiments the server system receives subsequent requests for a web page. Based on the request, the server system generates a list of images referenced in the requested web page. The server system then determines whether the list of requested web pages matches the list associated with any of the stored composite images. In accordance with a determination that the list of requested images for the requested web page match the list of images in a particular composite image, the server system then sends the particular composite image to the requesting client system.

FIG. 1 is a block diagram illustrating a client-server system 100 that includes one or more client systems 102, a server system 120, and one or more thin party systems 150. One or more communication networks 110 interconnect these components. The communication network 110 may be any of a variety of networks, including local area networks (LAN), wide area networks (WAN), wireless networks, wired networks, the Internet, personal area networks (PAN), or a combination of such networks.

In some example embodiments, a client system 102 is an electronic device, such as a personal computer (PC), a laptop, a hone, a tablet, a mobile phone, a wearable computing device, or any other electronic device capable of communication over the communication network 110. Some client systems 102 include one or more client applications 104, which are executed by the client system 102. In some example embodiments, the client application(s) 104 include one or more applications from a set consisting of search applications, communication applications, productivity applications, storage applications, word processing applications, travel applications, or any other useful applications. The client system 102 uses the client application(s) 104 to communicate with the server system 120 and transmit data to, and receive data from, the server system 120.

In some example embodiments, as shown by way of example in FIG. 1, the server system 120 generally includes three types of components, including front-end components, application logic components, and data components. As is understood by skilled artisans in the relevant computer and Internet-related arts, each module or engine shown in FIG. 1 represents a set of executable software instructions and the corresponding hardware (e.g., memory and processor) for executing the instructions. To avoid unnecessary detail, various functional modules and engines that are not germane to conveying an understanding of the various example embodiments have been omitted from FIG. 1. However, a skilled artisan will readily recognize that various additional functional modules and engines may be used with a server system 120, such as that illustrated in FIG. 1, to facilitate additional functionality that is not specifically described herein. Furthermore, the various functional modules and engines depicted in FIG. 1 may reside on a single server computer or may be distributed across several server computers in various arrangements. Moreover, although depicted in FIG. 1 as a three component type of architecture, the various example embodiments are by no means limited to this architecture.

As shown by way of example in FIG. 1, the server system 120 includes network interface module(s) (e.g., a web server) 122, which receives data from various client systems 102, and communicates data back to the appropriate client systems 102 when appropriate. For example, the network, interface module(s) 122 receives a web page request from a client system 102 and transmits the web page request to the web page request module 124. The web page request module 124 then accesses the web page database and retrieves and/or generates a web page based on the received web page request. The network interface module(s) 122 then transmits the generated web page to the requesting client system 102.

As shown by way of example in FIG. 1, the data components include web page data 130, image data 132, composite image data 134, and image metadata 136 for storing data associated with serving web page to client systems. The terms "database," "data," "dataset," and "data storage" are used interchangeably in the specification to refer to data that may or may not be stored in a specific database depending on the exact configuration used in a particular embodiment. Web page data 130 includes any data or image components that the web page request module 124 uses to generate a web page in response to a web page request. In some example embodiments, the web page request includes a search query and the web page request module 124 searches through the web page data 130 and generates a web page of search results.

The application logic components include a web page request module 124 and a composite image module 126. The web page request module 124 receives web page requests and in response, generates web pages that are then sent to the requesting client system 102. The composite image module 126 generates composite images from a list of images that are to be sent to client systems 102 in response to web page requests.

The web page request module 124 receives a web page request from a client system 102. The web page request includes a set of parameters that identify a specific web page or a search query that defines the types of search results the user is interested in. The web page request module 124 then identifies the specific web page or generates a web page based on the web page request. For example, if the user submits a web page request that includes a search query, the web page request module 124 then searches a database to identify one or more search results based on the search query and then generates a web page to display the search results to the user.

Once the web page has been identified or generated, the web page request module 124 then identifies a list of image files that are referenced in the web page (e.g., with at least one <img> tag). In some example embodiments, the list of image files that are referenced by the web page is generated by the client system 102 and then transmitted to the web page request module 124.

The composite image module 126 then creates a composite image file. The composite image file includes a list of all the images in the composite image file and data describing where each specific image is within the composite image. Each composite image is stored in a composite image database 134.

Each time a web page request is received, the web page request module 124 identifies the list of images referenced by the web page. Once the list of images has been identified, the web page request module 124 then determines whether the identified list of images matches the list of images for any of the composite images stored in the composite image database 134. In accordance with a determination that the identified list of images matches the list of images for a specific composite image, the web page request module 124 then sends the specific composite image to the requesting client system 102 without having to generate a new composite image.

As shown in FIG. 1, the data layer includes several databases, including databases for storing web page data 130, image data 132, composite image data 134, and image meta data 136.

In some example embodiments, the web page data 130 includes stored web pages (e.g., pre-generated web pages like a website's homepage), web page components such as templates and graphics that can be used to generate dynamic web pages, and search data that can be used to generate search results (e.g. item data in an e-commerce system).

In some example embodiments, image data 132 includes one or more images that can be used as components of web pages. Each image can be referenced in a web page that is served by the web page request module 124. The web pages include references which instruct the client system 102 to request the images for display with the web page.

In some example embodiments, composite image data 134 includes a plurality of already generated composite images. Each composite image includes a plurality of images that have been grouped into a single image file. The composite image module 126 can then store or retrieve files from the composite image data 134. In some example embodiments, the composite image data 134 includes image metadata 136. In some example embodiments, the image metadata 136 is stored in a related but distinct database. The image metadata 136 includes, for each composite image in the composite image data 134, a list of images stored in the associated composite image as well as information identifying where each image is in the composite image (e.g., coordinates within the image file).

In some example embodiments, third party systems 150 can connect to the server system 120 or the client system 102 through the communication network 110. In some example embodiments, the webpages reference an image stored at a third party system 150 and the server system 120 requests the image from the third party system 150 to use for building a composite image.

Figure 2:
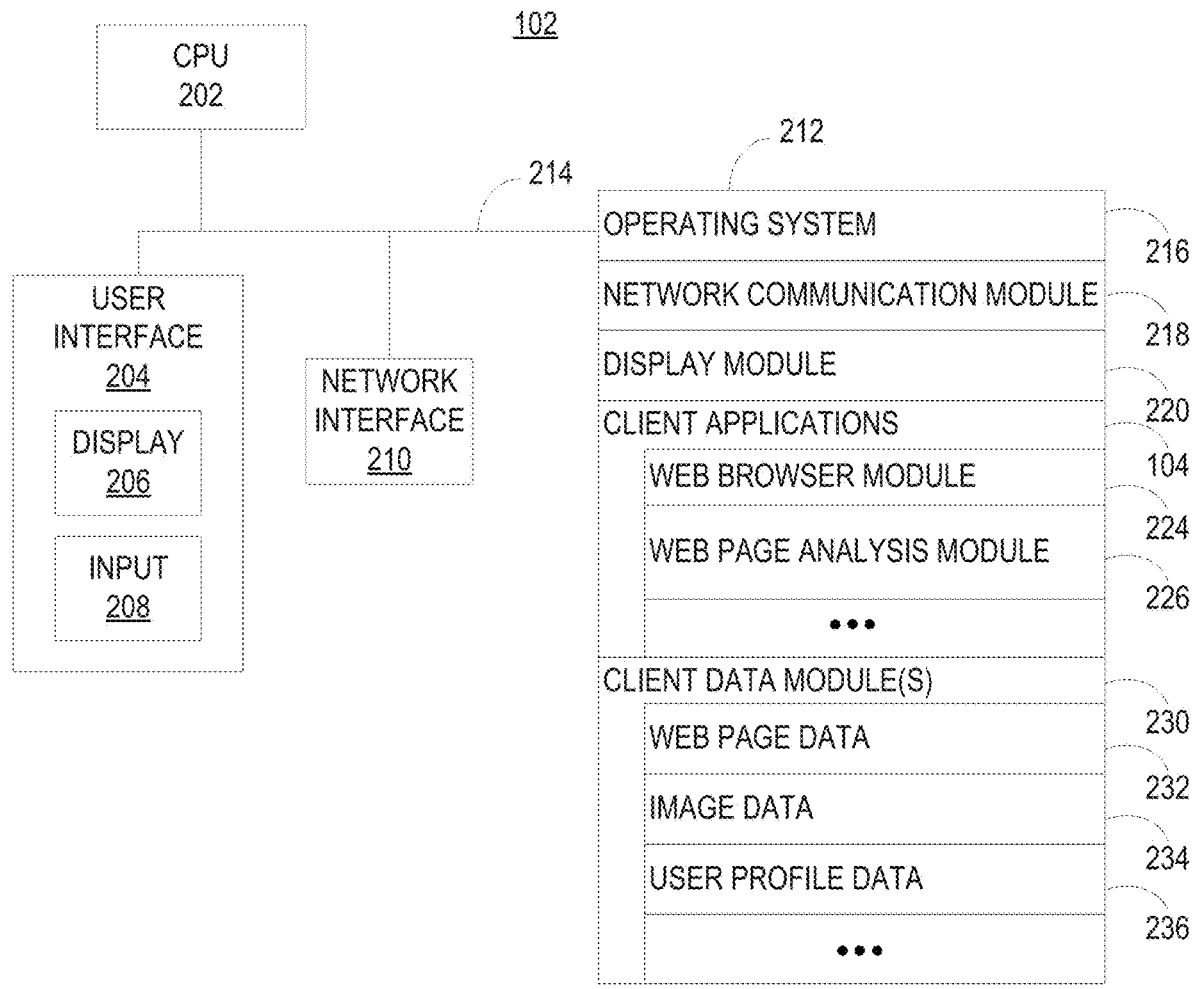
FIG. 2 is a block diagram illustrating a client system, in accordance with some embodiments.

FIG. 2 is a block diagram further illustrating the client system 102, in accordance with some example embodiments. The client system 102 typically includes one or more central processing units (CPUs) 202, one or more network interfaces 210, memory 212, and one or more communication buses 214 for interconnecting these components. The client system 102 includes a user interface 204. The user interface 204 includes a display device 206 and optionally includes an input means such as a keyboard, mouse, a touch sensitive display, or other input buttons 208. Furthermore, the client system 102 may use a microphone and voice recognition to supplement or replace the keyboard as a means of input.

Memory 212 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices, Memory 212 may optionally include one or more storage devices remotely located from the CPU(s) 202. Memory 212, or alternately, the non-volatile memory device(s) within memory 212, comprises a non-transitory computer readable storage medium.

In some example embodiments, memory 212, or the computer readable storage medium of memory 212, stores the following programs, modules, and data structures, or a subset thereof:
- an operating system 216 that includes procedures for handling various basic system services and for performing hardware dependent tasks;
- a network communication module 218 used for connecting the client system 102 to other computers via the one or more communication network interfaces 210 (wired or wireless) and one or more communication networks (e.g., communication network 110 of FIG. 1), such as the Internet, other WANs, LANs metropolitan area networks (MANs), etc.;
- a display module 220 for enabling the information generated by the operating system 216 to be presented visually as needed;
- one or more client applications 104 for handling various aspects of requesting and receiving numbers, including but not limited to:
  - a web browser module 224 for requesting and displaying data from one or more remote server systems over an network; and
  - a web page analysis module 226 for analyzing the contents of a web page to identify one or more images referenced by the web page that need to be requested to display the web page as intended; and
- client system data module(s) 230 for storing data at the client system 102, including but not limited to:
  - web page data 232 including data that instructs the web browser how to correctly render the web page;
  - image data 234 including data for one or more images to be displayed in the web browser as part of one or more web pages; and
  - user profile data 236 including profile data regarding the user associated with the client system 102 including, but not limited to, demographic information about the user, user interest information, user history information, and any other information regarding the user.

Figure 3:
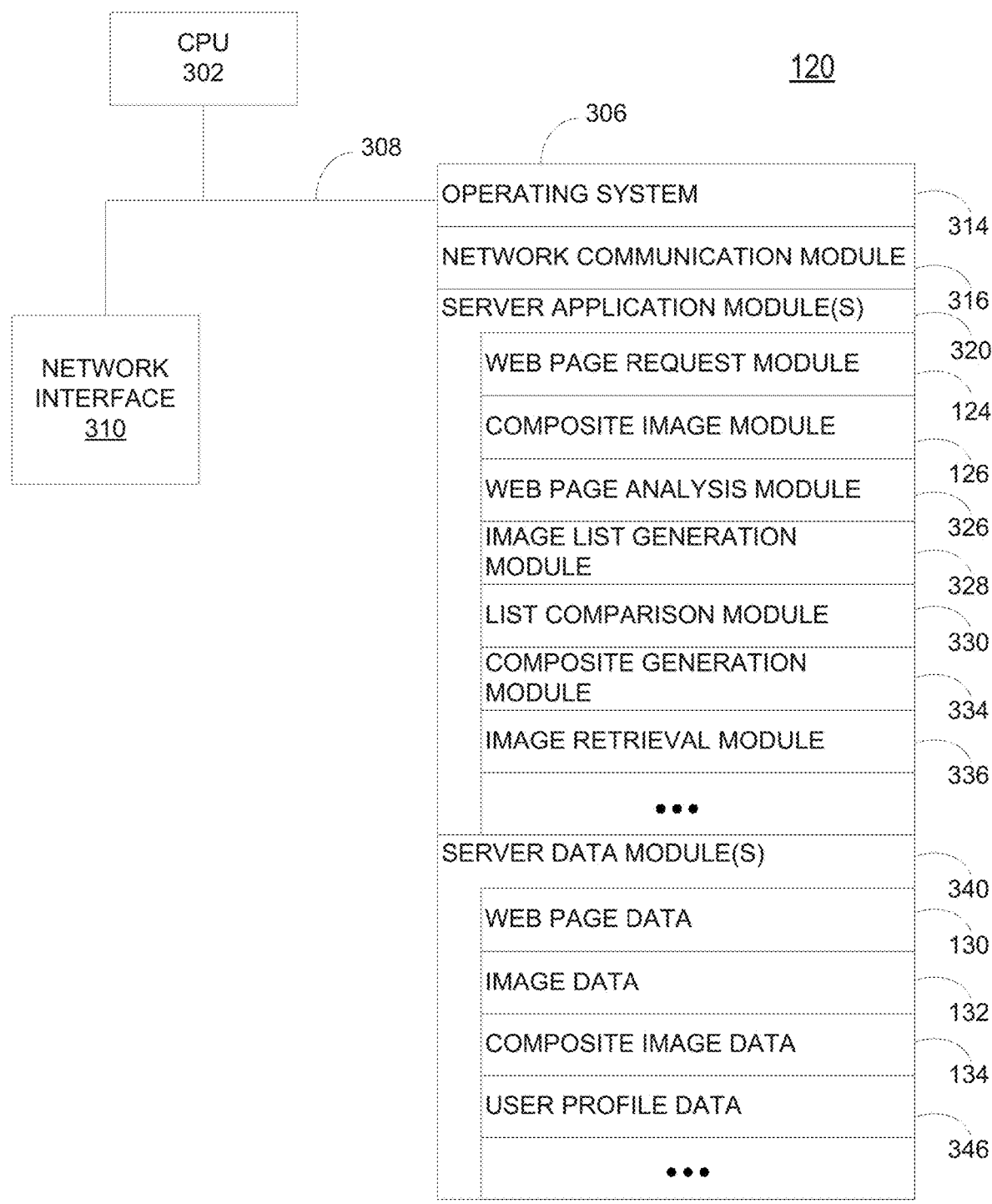
FIG. 3 is a block diagram illustrating a server system, in accordance with some embodiments.

FIG. 3 is a block diagram illustrating a server system 120, in accordance with some embodiments. The server system 120 typically includes one or more central processing units (CPUs) 302, one or more network interfaces 310, memory 306, and one or more communication buses 308 for interconnecting these components. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices, Memory 306 may optionally include one or more storage devices remotely located from the CPU(s) 302.

Memory 306, or alternately, the non-volatile memory device(s) within memory 306, comprises a non-transitory computer readable storage medium. In some embodiments, memory 306 or the computer readable storage medium of memory 306 stores the following programs, modules, and data structures, or a subset thereof
- an operating system 314 that includes procedures for handling various basic system services and for performing hardware dependent tasks;
- a network communication module 316 that is used for connecting the server system 120 to other computers via the one or more communication network interfaces 310 (wired or wireless) and one or more communication networks 110, such as the Internet, other WANs, LANS, MANs, and so on
- one or more server application modules 320 for performing the services offered by server system 120, including but not limited to:
  - a web page request module 124 for receiving web page requests from client systems 102, generating a web page based on the request, and transmitting the generated web page to the requesting client system 102;
  - a composite image module 126 for generating a composite image based on a list of source images;
  - a web page analysis module 326 for parsing, analyzing, and identifying the components of a web page;
  - a image list generation module 328 for generating a list of images associated with a web page given web page data 232 that defines the web page;
  - a list comparison module 330 for comparing two lists of images to determine whether they are identical;
  - a composite generation module 334 for generating the layout and composition of a composite image given a list of images;
  - an image retrieval module 336 for retrieving images from a third party system (e.g., system 150 in FIG. 1) when an image referenced by a web page is not stored in the image data 132 of the server system 120; and server data module(s) 340, holding data related to server system 120, including but not limited to:

web page data 232 including data used to display a preset or dynamically generated web page at a client system e.g., system 102 in FIG. 1) when rendered by a web browser; a image data 132 including images associated with products and services available on an e-commerce site associated with the server system 120;

composite image data 134 including one or more composite images created by the server system 120 and metadata associated with each composite image including the list of images in the composite image and the relative positions of each image within the composite image; and user profile data 346 including profile data regarding the user associated with the client system 102 including, but not limited to, demographic information about the user, user interest information, user history information, and any other information regarding the user.

Figure 4A:
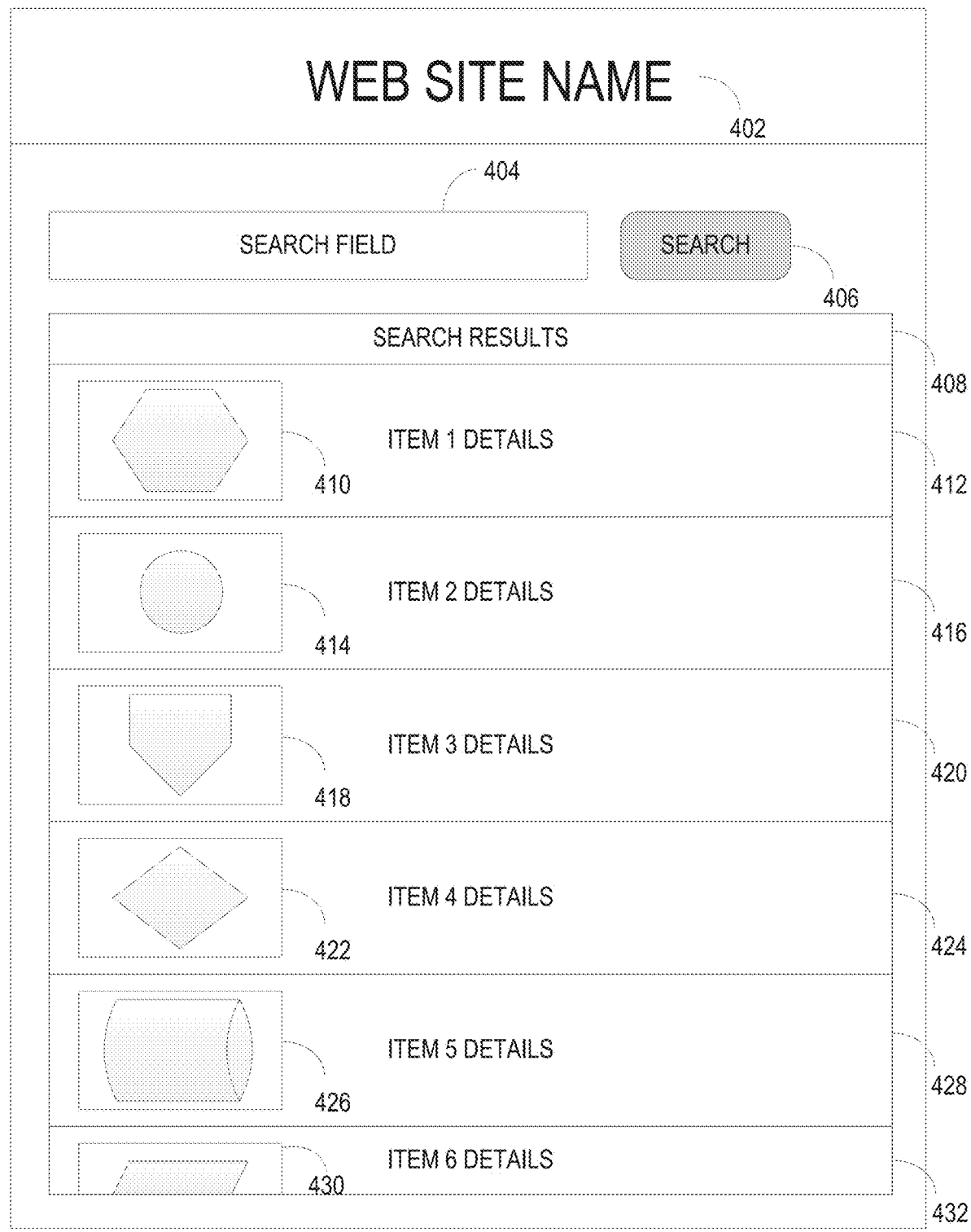
FIG. 4A illustrates an exemplary user interface for a web page that displays dynamically generated search results for products available in a networked commerce website in accordance with some embodiments.

FIG. 4A illustrates an exemplary user interface 400 for a web page that displays dynamically generated search results for products available in a networked commerce website. In this example, the user interface 400 includes a title bar 402 that displays the name of the website. Below the website title bar 402 is a search field input section 404. This input field allows the user to input one or more search terms as part of a search query. Once the search terms have all been entered, the user selects the search button 406 to initiate the search.

In this example, a search has already been completed and the web page displays dynamically generated search results 408 below the search input field. The search results include one or more item results (in this case, items 1-6 with number 412, 416, 420, 424, 428, and 432). Each search result includes one or more images that show the item that is associated with the image (410, 414, 418, 422, 426, and 430). Each result also includes item details in the section next to the image.

Figure 4B:
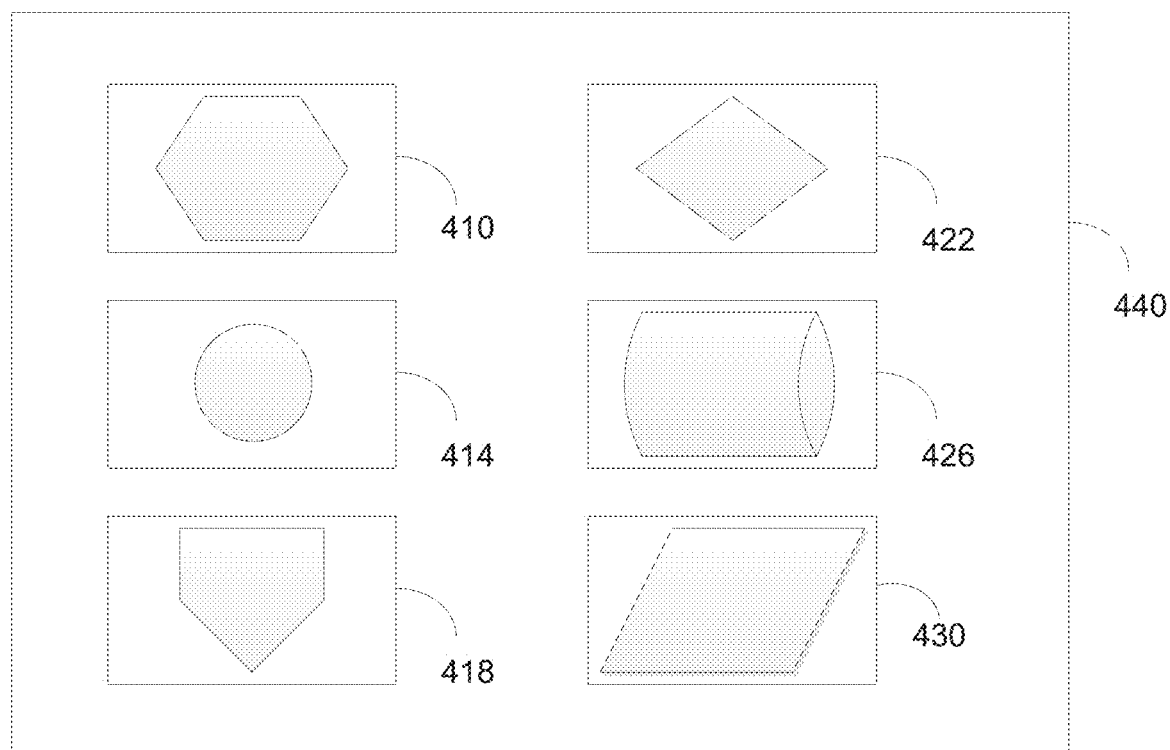
FIG. 4B illustrates an exemplary composite image tier one or more images associated with a web page in accordance with some embodiments.

FIG. 4B illustrates an exemplary composite image for one or more images associated with a web page. In this case, the server system (e.g., server system 120 in FIG. 1) analyzes the web page shown in FIG. 4A to determine a list of images that are associated with the web page. The server system 120 the retrieves each image (410, 414, 418, 422, 426, and 430) and creates a composite image 440 that includes all the component images. This composite image 440 can then be transmitted to a client system (e.g., client system 102 in FIG. 1) in lieu of sending six separate image files.

FIG. 5 is a flow diagram illustrating a process for improving performance of web pages by on-demand generation of composite images 440, in accordance with some embodiments. Each of the operations shown in FIG. 5 corresponds, in some embodiments, to instructions stored in a computer memory or computer readable storage medium. In some embodiments, the method 500 described with reference to FIG. 5 is performed by a server system (e.g., server system 120 in FIG. 1).

The method 500 is performed at a server system (e.g., server system 120 in FIG. 1) including one or more processors and memory 306 storing one or more programs for execution by the one or more processors. The server system (e.g., server system 120 in FIG. 1) receives (502) a web page request from a client system (e.g., system 102 in FIG. 1). In some example embodiments, the web page request identifies a specific web page (e.g., a predefined webpage). In other embodiments, the web page request includes a search query or other information that will result in the server system (e.g., server system 120 in FIG. 1) generating a dynamically generated web page.

In response to receiving the web page request, the server system (e.g., server system 120 in FIG. 1) analyzes (504) the requested web page to identify a list of requested images. The list of requested images include any image (or other file) that is references in the web page data 232 for the requested web page (e.g., in a <img> tag).

In some example embodiments, the server system (e.g., server system 120 in FIG. 1) then determines (506) whether the identified list of requested images match the list of images of any composite images 440 stored in a composite image database 134. The composite image database 134 stores a plurality of previously generated composite images 440 (based on previous web page requests) and stores metadata for each image including, but not limited to a list of images in the composite image 440 and data describing how the images are laid out in the composite image 440.

In accordance with a determination (508) that the list of requested images matches the list of images included in a composite image 440 in the composite image database 134, the server system (e.g., server system 120 in FIG. 1) retrieves (514) the stored matching composite image 440.

In accordance with a determination (508) that the list of requested images does not match the list of images included in a composite image 440 in the composite image database 134, the server system (e.g., server system 120 in FIG. 1) retrieves (510) each image in the list of requested images. In some example embodiments, the images are stored in an image database 132 at the server system (e.g., server system 120 in FIG. 1). In other embodiments, the images are stored on a third party server system (e.g., system 150 in FIG. 1).

The server system (e.g., server system 120 in FIG. 1) uses the retrieved images to generate (512) a composite image file (e.g., a single file that includes all the retrieved images). The server system (e.g., server system 120 in FIG. 1) then sends (516) the composite image file to the requesting client system (e.g., system 102 in FIG. 1). The generated composite image can then be stored in the composite image database 134 for future use.

Figure 6A:
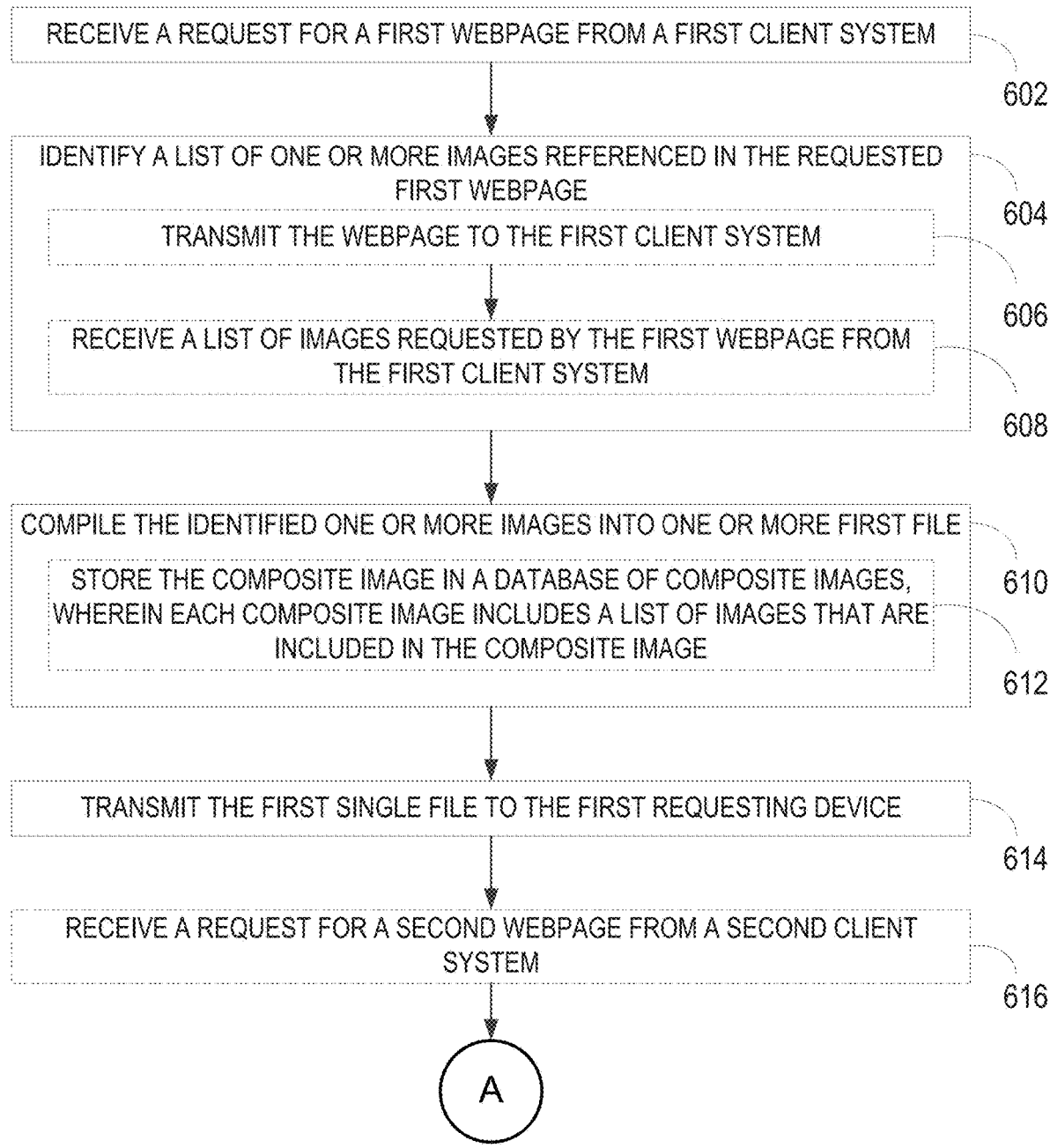
FIGS. 6A-6C are flow diagrams illustrating a process for improving performance of web pages by on-demand generation of composite images in accordance with some embodiments.

FIG. 6A is a flow diagram illustrating a method for improving performance of web pages by on-demand generation of composite images 440 in accordance with some embodiments. Each of the operations shown in FIG. 6A may correspond to instructions stored in a computer memory or computer readable storage medium. Optional operations are indicated by dashed lines (e.g., boxes with dashed-line borders). In some embodiments, the method described in FIG. 6A is performed by the server system (e.g., server system 120 in FIG. 1). However, the method described can also be performed by any other suitable configuration of electronic hardware.

In some embodiments, the method is performed at a server system (e.g., server system 120 in FIG. 1) including one or more processors and memory 306 storing one or more programs for execution by the one or more processors.

In some example embodiments, the server system (e.g., server system 120 in FIG. 1) receives (602) a request for a first webpage from a first client system 102. The request is received over a networked computer system (e.g., an request). In some example embodiments, the request for a web page includes a search query. In some example embodiments, the first webpage is dynamically generated by the server system 120 in response to the request. For example, the webpage request includes a search query and the server system (e.g., server system 120 in FIG. 1) dynamically generates a webpage that lists the top search results.

In some example embodiments, the server system (e.g., server system 120 in FIG. 1) identifies (604) a list of one or more images referenced in the requested first webpage. For example, the server system (e.g., server system 120 in FIG. 1) parses the data that represents the webpage (e.g., HTML code, Javascript code, PHP scripts, CSS files, and so on to determine one or more images that the client system (e.g., system 102 in FIG. 1) will use when displaying the final webpage to a user. Typically, the client system (e.g., system 102 in FIG. 1) sends a unique HTTP request for each image that is requested. The server system (e.g., server system 120 in FIG. 1) then creates a list of all the image files (or other files) that are needed to display the webpage.

In some example embodiments, as part of identifying a list of requested image files, the server system (e.g., server system 120 in FIG. 1) transmits (606) the webpage to the first client system (e.g., system 102 in FIG. 1). For example, the server system (e.g., server system 120 in FIG. 1) transmits the web page data 232 (e.g., HTML data/CSS data) to the client system (e.g., system 102 in FIG. 1) for display.

In some example embodiments, the server system (e.g., server system 120 in FIG. 1) receives (608) a list of images requested by the first webpage from the first client system 102. Each image has a file name and a file location. The server system (e.g., server system 120 in FIG. 1) then retrieves all the images in the list of files.

In some example embodiments, the server system (e.g., server system 120 in FIG. 1) then compiles (610) the identified one or more images into one or more first file. In some example embodiments, the one or more first files are composite image files (e.g., large files that include all the images in a set of image files in one file.)

In some example embodiments, the server system (e.g., server system 120 in FIG. 1) has a tool or application that can automatically, given a set of images, create a composite image 440 that includes all the images in the list. This generation of a composite image 440 is only performed in response to a webpage request that includes a dynamically generated webpage because it would be impractical to generate all possible composite images 440.

In some example embodiments, the server system (e.g., server system 120 in FIG. 1) does not include all the images in a webpage in the composite image 440. Instead, the server system (e.g., server system 120 in FIG. 1) determines which images to store in the one or more composite images 440 based on a number of factors, including, but not limited to size of the images, color of the image, image location within the page, and so on. In some example embodiments, a webpage is large enough that the entire page cannot be displayed at one time on a given display 206 at a certain level of magnification.

The server system (e.g., server system 120 in FIG. 1) then determines which images will be displayed when the web page is first loaded. Then, the server system (e.g., server system 120 in FIG. 1) does not include those images in the composite image 440. Instead the server system (e.g., server system 120 in FIG. 1) generates a composite image 440 for all the images on the display that will only be displayed if the user scrolls, clicks a link, or otherwise navigates to view a part of the webpage that was not originally displayed. In this way, the first few images can be displayed without any extra delay while the composite image 440 is being created (although this delay is likely very minimal).

In some example embodiments, the server system (e.g., server system 120 in FIG. 1) first determines whether there is any chance of network latency problems when loading the requested webpage based on information about the size, type, number and location of the requested images. If the chance for network latency problems is small, the server system (e.g., server system 120 in FIG. 1) will not create a composite image 440 at all. In some example embodiments, all the decisions concerning whether to mike a composite image 440 and what images to group are made automatically by the server system (e.g., server system 120 in FIG. 1) without intervention from a user.

In some example embodiments, the server system (e.g., server system 120 in FIG. 1) stores (612) composite images 440 in a database of composite images 134 associated with the server system (e.g., server system 120 in FIG. 1). Each composite image 440 includes or has associated metadata that lists a list of images that are included in the composite image 440 and information on which image is displayed in which portion of the composite image 440 for later retrieval.

The server system (e.g., server system 120 in FIG. 1) transmits (614) the first file (e.g., composite image file) to the first requesting client system (e.g., system 102 in FIG. 1). This transmitting is done over a network connection.

In some example embodiments, the server system (e.g., server system 120 in FIG. 1) receives (616) a second request for a second webpage from a second client system (e.g., system 102 in FIG. 1). In some example embodiments, the first webpage and the second webpage are the same page. For example, two similar users who enter the same search query may receive the same dynamically generated webpage because the search results are the same for both searches.

Figure 6B:
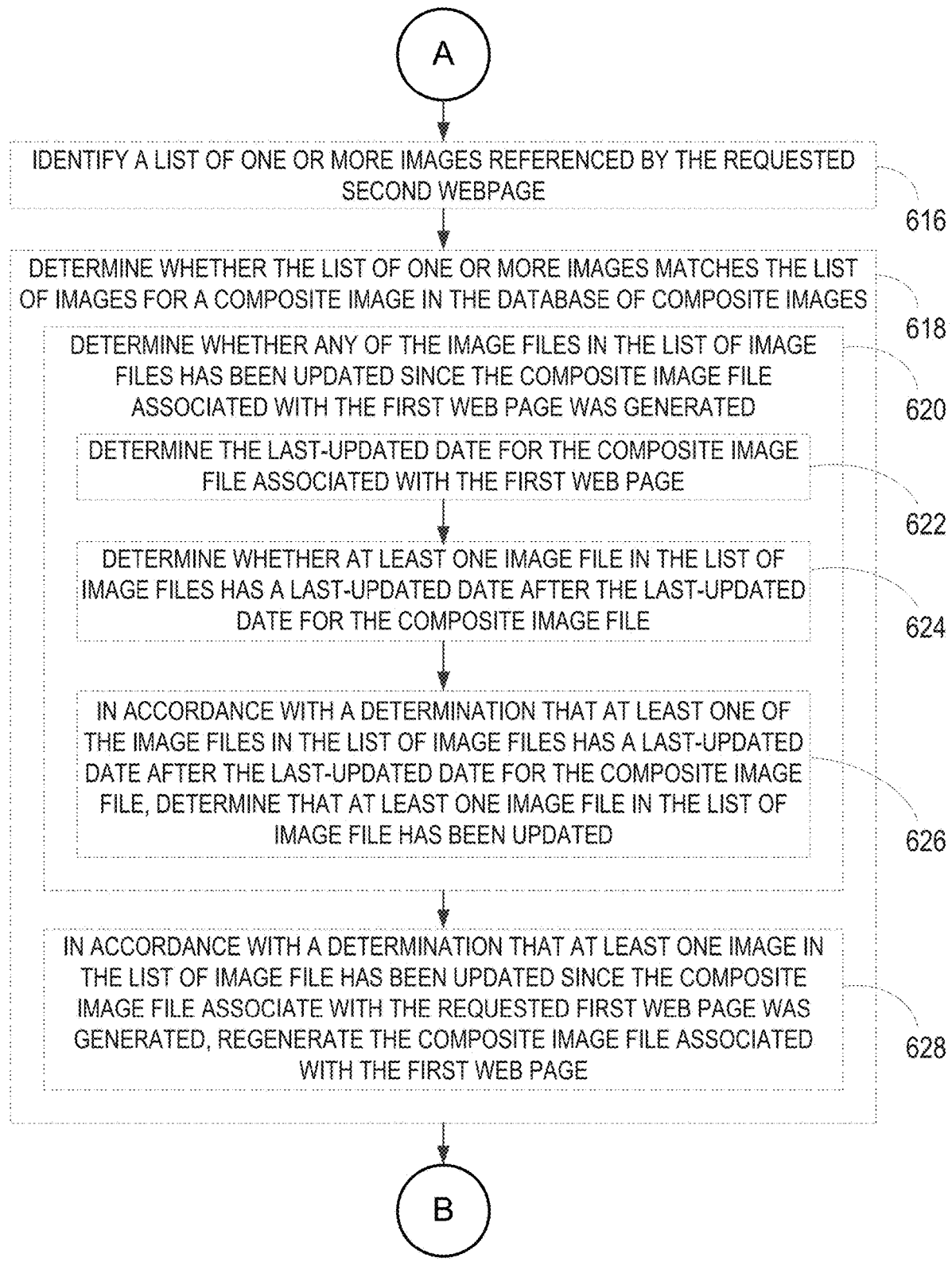

FIG. 6B is a flow diagram illustrating a method for improving performance of web pages by on-demand generation of composite images 440 in accordance with some embodiments. Each of the operations shown in FIG. 6B may correspond to instructions stored in a computer memory or computer readable storage medium. Optional operations are indicated by dashed lines (e.g., boxes with dashed-line borders). In some embodiments, the method described in FIG. 6B is performed by the server system (e.g., server system 120 in FIG. 1). However, the method described can also be performed by any other suitable configuration of electronic hardware.

In some embodiments, the method is performed at a server system (e.g., server system 120 in FIG. 1) including one or more processors and memory storing one or more programs for execution by the one or more processors.

The server system (e.g., server system 120 in FIG. 1) identifies (616) a list of one or more images referenced by the requested second webpage. As described above, the server system (e.g., server system 120 in FIG. 1) parses the webpage file data to determine a list of image files that are included when the requested webpage is displayed.

The server system (e.g., server system 120 in FIG. 1) determines (618) whether the list of one or more images matches the list of images for a composite image 440 in the database of composite images 134. In some example embodiments, the server system (e.g., server system 120 in FIG. 1) determines (620) whether any of the image files in the list of image files has been updated since the composite image file associated with the first web page was generated.

In some example embodiments, in accordance with a determination that at least one image in the list of image file has been updated since the composite image file associate with the requested first web page was generated, the server system (e.g., server system 120 in FIG. 1) regenerates (628) the composite image file associated with the first web page.

In some example embodiments, each image file and composite image file has an associated last-updated date. In some example embodiments, the associated last-updated date for each image file and the composite image file are stored in metadata for the composite image file. Further, in some example embodiments, determining whether any of the image files in the list of image files has been updated since the composite image file associated with the first web page was generated, the server system (e.g., server system 120 in (FIG. 1) determines (622) the last-updated date for the composite image file associated with the first web page.

In some example embodiments, the server system (e.g., server system 120 in FIG. 1) determines (624) whether at least one image file in the list of image files has a last-updated date after the last-updated date for the composite image file. In accordance with a determination that at least one of the image files in the list of image files has a last-updated date after the last-updated date for the composite image file, the server system (e.g., server system 120 in FIG. 1) determines (626) that at least one image file in the list of image file has been updated.

Figure 6C:
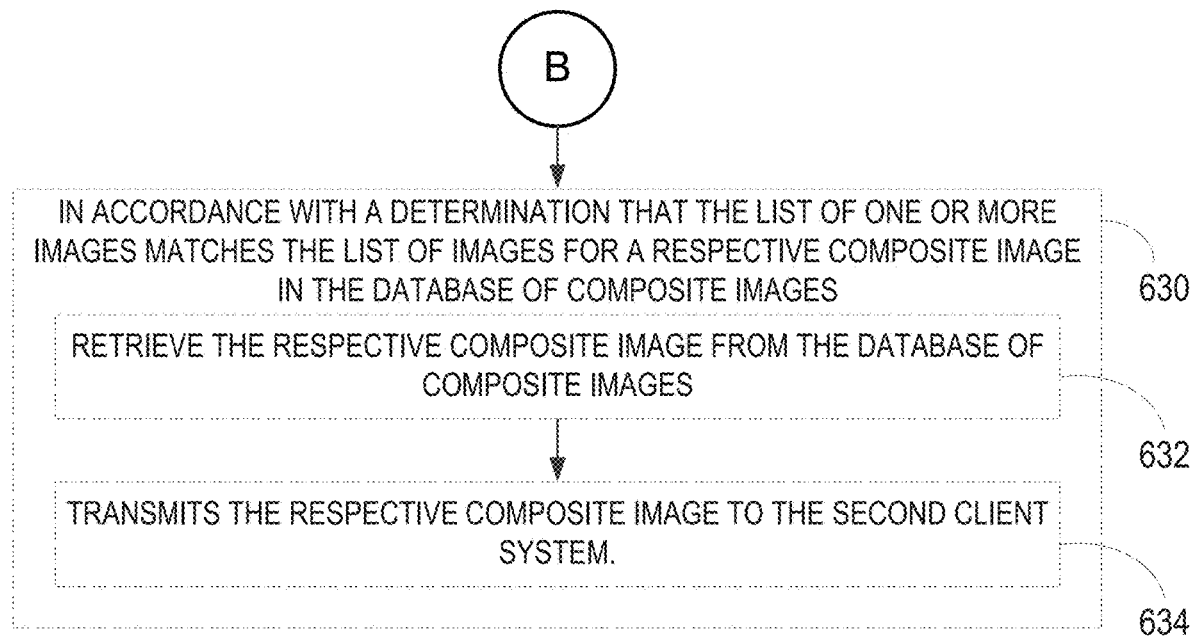

FIG. 6C is a flow diagram illustrating a method for improving performance of web pages by on-demand generation of composite images 440 in accordance with some embodiments. Each of the operations shown in FIG. 6C may correspond to instructions stored in a computer memory or computer readable storage medium. Optional operations are indicated by dashed lines (e.g., boxes with dashed-line borders). In some embodiments, the method described in FIG. 6C is performed by the server system (e.g., server system 120 in FIG. 1). However, the method described can also be performed by any other suitable configuration of electronic hardware.

In some embodiments, the method is performed at a server system (e.g., server system 120 in FIG. 1) including one or more processors and memory storing one or more programs for execution by the one or more processors.

In accordance with a determination that the list of one or more images matches (630) the list of images for a respective composite image 440 in the database of composite images 134, the server system (e.g., server system 120 in FIG. 1) retrieves (632) the respective composite image 440 from the database of composite images 134 and transmits (634) the respective composite image 440 to the second client system.

Software Architecture

Figure 7:
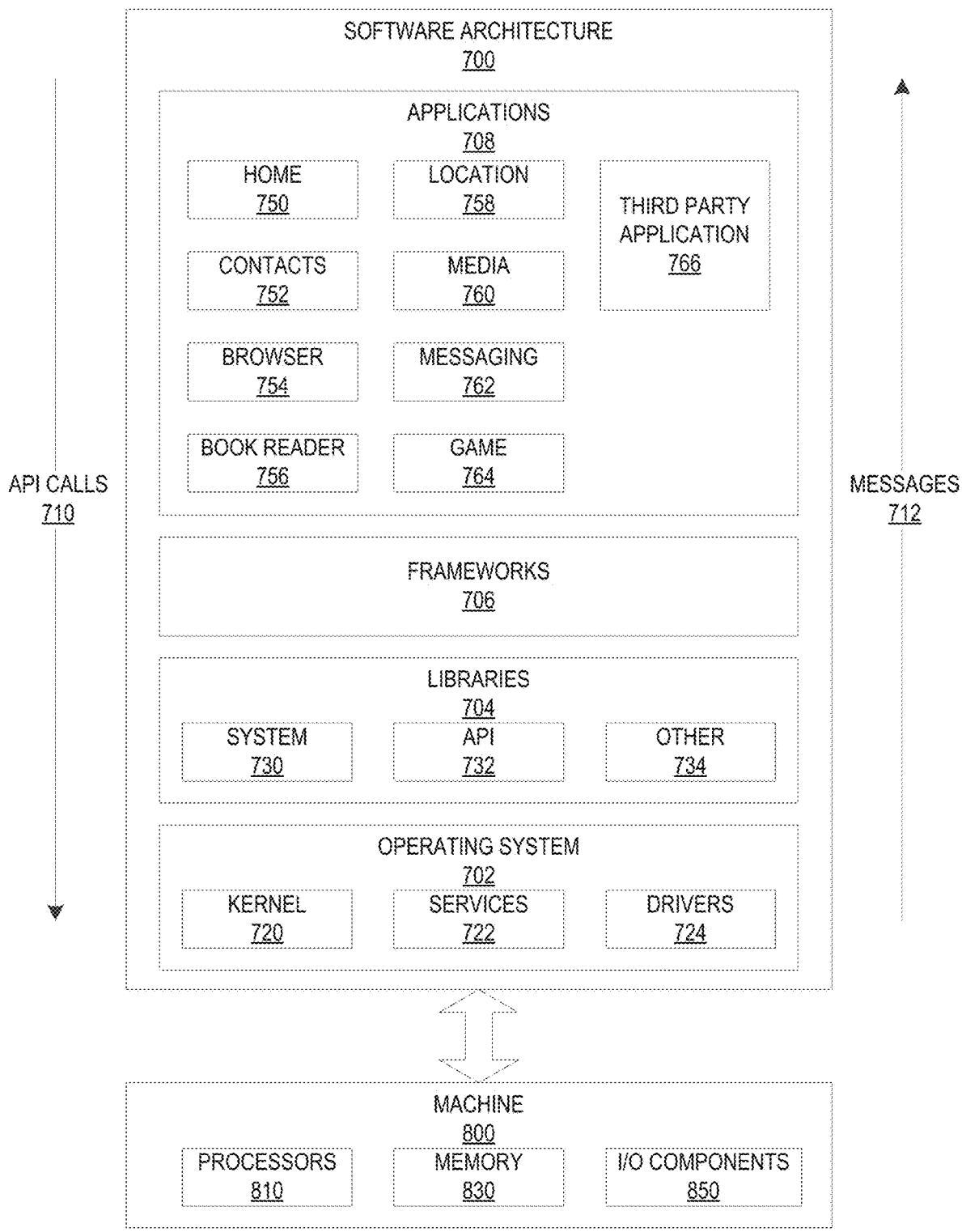
FIG. 7 is a block diagram illustrating an architecture of software, which may be installed on any one or more of devices of a computer system.

FIG. 7 is a block diagram illustrating an architecture of software 700, which may be installed on any one or more of devices of FIG. 1 (e.g., client system(s) 102 or server system 120). FIG. 7 is merely a non-limiting example of a software architecture 700 and it will be appreciated that many other architectures may be implemented to facilitate the functionality described herein. The software 700 may be executing on hardware such as machine 800 of FIG. 8 that includes processors 810, memory 830, and I/O components 850. In the example architecture of FIG. 7, the software 700 may be conceptualized as a stack of layers where each layer may provide particular functionality. For example, the software 700 may include layers such as an operating system 702, libraries 704, frameworks 706, and applications 708. Operationally, the applications 708 may invoke application programming interface (API) calls 710 through the software stack and receive messages 712 in response to the API calls 710.

The operating system 702 may manage hardware resources and provide common services. The operating system 702 may include, for example, a kernel 720, services 722, and drivers 724. The kernel 720 may act as an abstraction layer between the hardware and the other software layers. For example, the kernel 720 may be responsible for memory management, processor management (e.g., scheduling), component management, networking, security settings, and so on. The services 722 may provide other common services for the other software layers. The drivers 724 may be responsible for controlling and/or interfacing with the underlying hardware. For instance, the drivers 724 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 704 may provide a low-level common infrastructure that may be utilized by the applications 708. The libraries 704 may include system libraries 730 (e.g., C standard library) that may provide functions such as memory allocation functions, string manipulation functions, mathematic functions, and the like. In addition, the libraries 704 may include API libraries 732 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 704 may also include a wide variety of other libraries 734 to provide many other APIs to the applications 708.

The frameworks 706 may provide a high-level common infrastructure that may be utilized by the applications 708. For example, the frameworks 706 may provide various graphic user interface (GUI) functions, high-level resource management, high-level location services, and so forth. The frameworks 706 may provide a broad spectrum of other APIs that may be utilized by the applications 708, some of which may be specific to a particular operating system 702 or platform.

The applications 708 include a home application 750, a contacts application 752, a browser application 754, a book reader application 756, a location application 758, a media application 760, a messaging application 762, a game application 764, and a broad assortment of other applications such as third party application 766. In a specific example, the third party application 766 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 766 may invoke the API calls 710 provided by the mobile operating system 702 to facilitate functionality described herein.

Example Machine Architecture and
Machine-Readable Medium

Figure 8:
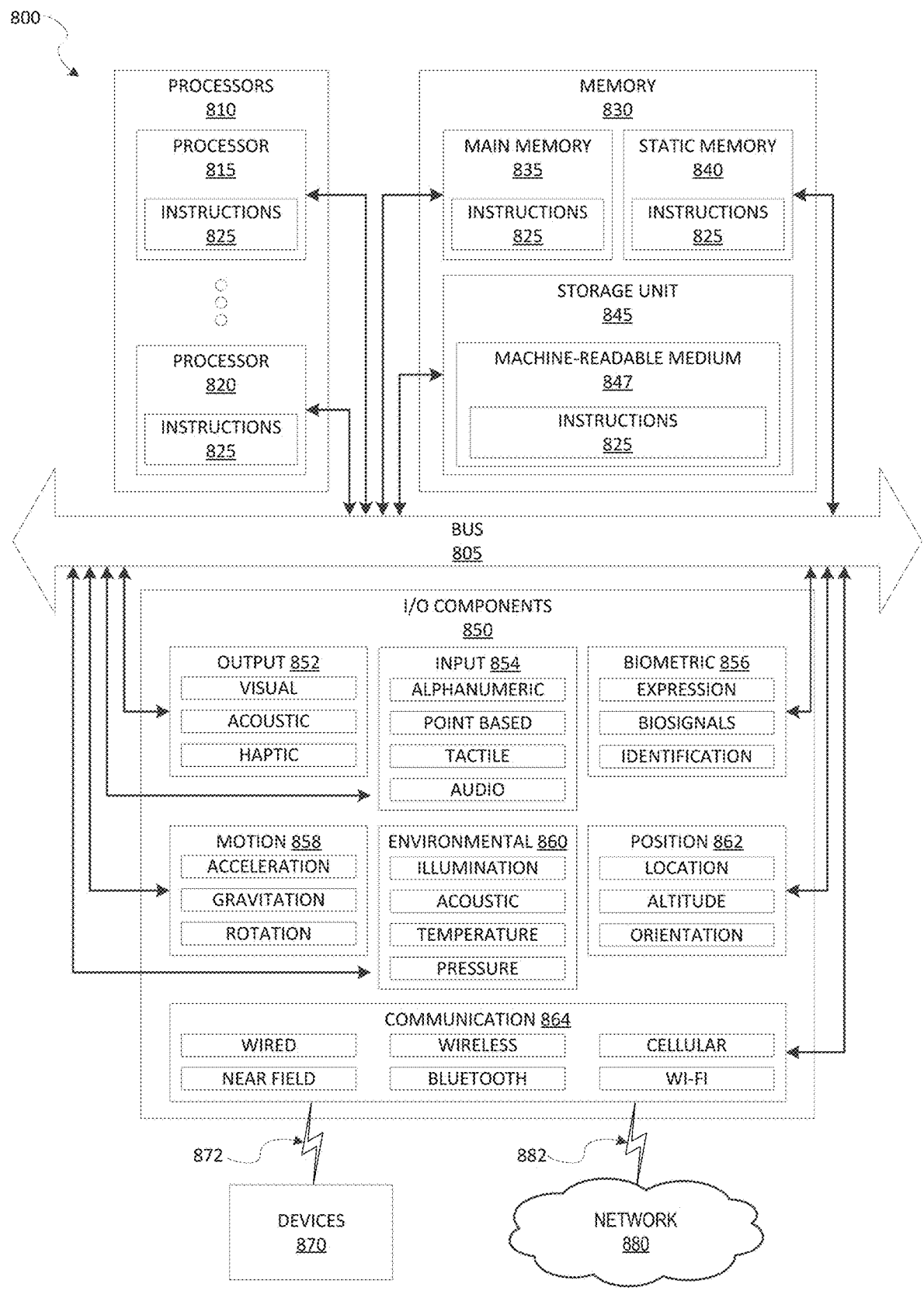
FIG. 8 is a block diagram illustrating components of a machine, according to some example embodiments.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 825 (e.g., software, a program, an application, an applet, an app, or other executable code) for causing the machine 800 to perform any one or more of the methodologies discussed herein may be executed. In alternative embodiments, the machine 800 operates as a stand-alone device or may be coupled (e.g., networked) to other machines. In a networked deployment, the machine 800 may operate in the capacity of a server machine 120 or a client machine 102 in a server-client network environment, or as a peer machine in a peer-to-peer (or distributed) network environment. The machine 800 may comprise, but be not limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 825, sequentially or otherwise, that specify actions to be taken by machine 800. Further, while only a single machine 800 is illustrated, the term "machine" shall also be taken to include a collection of machines 800 that individually or jointly execute the instructions 825 to perform any one or more of the methodologies discussed herein.

The machine 800 may include processors 810, memory 830, and I/O components 850, which may be configured to communicate with each other via a bus 805. In an example embodiment, the processors 810 (e.g., a CPU, a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 815 and processor 820 that may execute instructions 825. The term "processor" is intended to include a multi-core processor 810 that may comprise two or more independent processors (also referred to as "cores") that may execute instructions 825 contemporaneously. Although FIG. 8 shows multiple processors 810, the machine 800 may include a single processor 810 with a single core, a single processor 810 with multiple cores (e.g., a multi-core process), multiple processors 810 with a single core, multiple processors with multiples cores, or any combination thereof.

The memory 830 may include a main memory 835, a static memory 840, and a storage unit 845 accessible to the processors 810 via the bus 805. The storage unit 845 may include a machine-readable medium 847 on which are stored the instructions 825 embodying any one or more of the methodologies or functions described herein. The instructions 825 may also reside, completely or at least partially, within the main memory 835, within the static memory 840, within at least one of the processors 810 (e.g., within the processor 810's cache memory), or any suitable combination thereof, during execution thereof by the machine 800. Accordingly, the main memory 835, static memory 840, and the processors 810 may be considered as machine-readable media 847.

As used herein, the term "memory" refers to a machine-readable medium 847 able to store data temporarily or permanently and may be taken to include, but not be limited to, random-access memory (RAM), read-only memory (ROM), buffer memory, flash memory, and cache memory. While the machine-readable medium 847 is shown in an example embodiment to be a single medium, the term "machine-readable medium" should be taken to include a single medium or multiple media (e.g., a centralized or distributed database, or associated caches and servers) able to store instructions 825. The term "machine-readable medium" shall also be taken to include any medium, or combination of multiple media, that is capable of storing instructions (e.g., instructions 825) for execution by a machine (e.g., machine 800), such that the instructions 825, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 may include a wide variety of components to receive input, provide and/or produce output, transmit information, exchange information, capture measurements, and so on. It will be appreciated that the I/O components 850 may include many other components that are not shown in FIG. 8. In various example embodiments, the I/O components 850 may include output components 852 and/or input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, and/or other pointing instrument), tactile input components (e.g., a physical button, a touch screen that provide location and force of touches or touch gestures, and/or other tactile input components), audio input components (e.g., a microphone), and the like.

In further example embodiments, the I/O components 850 may include biometric components 856, motion components 858, environmental components 860, and/or position components 862 among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), and/or other components that may provide indications, measurements, and/or signals corresponding to a surrounding physical environment. The position components 862 may include location sensor components (e.g., a GPS receiver component), altitude sensor components (e.g., altimeters and/or barometers that detect air pressure from which attitude may be derived), orientation sensor components (e.g., magnetometers), and the like.

Communication may be implemented using a wide variety of technologies. The I/O components 850 may include communication components 864 operable to couple the machine 800 to a network 880 and/or devices 870 via coupling 882 and coupling 872 respectively. For example, the communication components 864 may include a network interface component or other suitable device to interface with the network 880. In further examples, communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine and/or any of a wide variety of peripheral devices (e.g., a peripheral device coupled via a USB).

Moreover, the communication components 864 may detect identifiers and/or include components operable to detect identifiers. For example, the communication components 864 may include radio frequency identification (MD) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF48, Ultra Code, UCC RSS-2D bar code, and other optical codes), acoustic detection components (e.g., microphones to identify tagged audio signals), and so on. In additional, a variety of information may be derived via the communication components 864 such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 880 may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Di-vision Multiple Access (CDMA) connection, a Global System for Mobile communications (GSM) connection, or other type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 825 may be transmitted and/or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 825 may be transmitted and/or received using a transmission medium via the coupling 872 (e.g., a peer-to-peer coupling) to devices 870. The term "transmission medium" shall be taken to include any intangible medium that is capable of storing, encoding, or carrying instructions 825 for execution by the machine 800, and includes digital or analog communications signals or other intangible medium to facilitate communication of such software. The term "transmission medium" excludes "machine-readable medium" as defined and described above.

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
    receiving a request for a first webpage, at a server system with one or more processors via a network, from a first client system;
    identifying a first set of images referenced by the first webpage;
    determining whether there is a chance of network latency problems related to the first client system loading the requested webpage based on a preexisting latency issue that already exists and based on information about at least one of: a size, a type, a number, or a location of the first set of images;
    in response to determining that the chance of network latency problems related to the first client system loading the requested webpage exceeds a threshold amount, determining, based on one or more image display factors corresponding to the first webpage, a second set of images referenced by the first webpage, the second set of images being a subset of the first set of images;
    generating a composite image file that includes data describing corresponding image locations, within the first webpage, of each image of the second set of images; and
    transmitting the composite image file to the first client system, the transmitting causing the first client system to display the second set of images according to the composite image file.

2. The method of claim 1, further comprising storing the composite image file in a database of composite images, wherein the composite image file includes a list of images that are included in the composite image file.

3. The method of claim 2, further including:
    receiving a second request for a second webpage from a second client system;
    identifying a list of one or more images referenced by the second webpage;
    determining whether the list of one or more images matches the list of images for a second composite image file in the database of composite images; and
    in accordance with a determination that the list of one or more images matches the list of images for the second composite image file in the database of composite images:
        retrieving the second composite image file from the database of composite images; and
        transmitting the second composite image file to the second client system.

4. The method of claim 3, wherein the first webpage and the second webpage are the same webpage.

5. The method of claim 1, wherein the first webpage is dynamically generated by the server system.

6. The method of claim 2, wherein prior to the generating the composite image file, determining whether the second set of images matches a list of images for a particular composite image file in the database of composite images.

7. The method of claim 6, further comprising:
    prior to the generating the composite image file, determining that the second set of images fails to match any composite image in the database of composite images.

8. The method of claim 3, further comprising:
    in accordance with the determination that the list of one or more images matches the list of images for the second composite image file, determining whether any images of the list of one or more images has been updated since the second composite image file was generated.

9. A server system comprising:
    one or more processors;
    memory; and
    one or more programs stored in the memory, the one or more programs comprising instructions that, in response to being executed by the one or more processors, cause the server system to perform operations comprising:
        receiving a request for a first webpage from a first client system via a network;
        identifying a first list of one or more images referenced by the requested first webpage;
        determining whether there is a chance of network latency problems related to the first client system loading the requested webpage based on a preexisting latency issue that already exists and based on information about at least one of a size, a type, a number, or a location of a first set of images;
        in response to determining that the chance of network latency problems related to the first client system loading the requested webpage exceeds a threshold amount, determining, based on one or more image display factors corresponding to the first webpage, a second list of one or more images referenced by the first webpage, the second list of one or more images being a subset of the first list of one or more images;
        determining whether the second list of one or more images referenced in the first webpage matches a list of images referenced by a composite image file stored in a database of composite images; and
        in response to determining that the second list of one or more images referenced by the requested first webpage matches the list of images by the composite image file, retrieving the composite image file and transmitting the composite image file to the first client system, wherein the composite image file includes data describing corresponding image locations, within the first webpage, of each image of the second list of one or more images referenced by the composite image file.

10. The server system of claim 9, wherein the first webpage is dynamically generated by the server system.

11. The server system of claim 9, wherein the operations further comprise storing the composite image file in a database of composite image files, wherein each composite image file includes a respective list of images.

12. A non-transitory computer-readable storage medium storing instructions that, in response to being executed by one or more processors of a machine, cause the machine to perform operations comprising:

receiving a request for a first webpage from a first client system via a network;

identifying a first set of images referenced by the first webpage;

determining whether there is a chance of network latency problems related to the first client system loading the requested webpage based on a preexisting latency issue that already exists and based on information about at least one of a size, a type, a number, or a location of the first set of images;

in response to determining that the chance of network latency problems related to the first client system loading the requested webpage exceeds a threshold amount, determining, based on one or more image display factors corresponding to the first webpage, a second set of images referenced by the first webpage, the second set of images being a subset of the first set of images;

generating a first file that includes data describing corresponding image locations, within the first webpage, of each image of the second set of images; and transmitting the first file to the first client system, the transmitting causing the first client system to display the second set of images according to the first file.

13. The non-transitory computer-readable storage medium of claim 12, wherein the first webpage is dynamically generated by the one or more processors.

14. The non-transitory computer-readable storage medium of claim 12, wherein the request for the first webpage includes a search query.

15. The method of claim 1, wherein the determining whether there is a chance of network latency problems related to the first client system loading the requested webpage comprises:

determining that a network latency corresponding to the network is greater than a network latency threshold.

16. The method of claim 1, wherein the one or more image display factors comprises data associated with the first set of images, the data selected from the group consisting of image size data, image color data, and image location within the first webpage.

17. The method of claim 1, wherein the determining the second set of images comprises identifying one or more images from the first set of images that will not be initially be displayed on first webpage when the first webpage is first loaded.

18. The server system of claim 9, wherein the determining whether there is a chance of network latency problems related to the first client system loading the requested webpage comprises:

determining that a network latency corresponding to the network is greater than a network latency threshold.

19. The server system of claim 9, wherein the one or more image display factors comprises data associated with the first list of one or more images, the data selected from the group consisting of image size data, image color data, and image location within the first webpage.

20. The non-transitory computer-readable storage medium of claim 12, wherein the determining whether there is a chance of network latency problems related to the first client system loading the requested webpage comprises:

determining that a network latency corresponding to the network is greater than a network latency threshold.

* * * * *